(12) United States Patent
Ochi et al.

(10) Patent No.: US 7,859,774 B2
(45) Date of Patent: Dec. 28, 2010

(54) OBJECTIVE LENS ACTUATOR AND A DISC APPARATUS USING THE SAME THEREIN

(75) Inventors: Manabu Ochi, Hitachinaka (JP); Katsuhiko Kimura, Kasumigaura (JP); Souichirou Yamada, Yokohama (JP); Tetsuo Itou, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 58 days.

(21) Appl. No.: 12/265,748

(22) Filed: Nov. 6, 2008

(65) Prior Publication Data
US 2009/0116129 A1    May 7, 2009

(30) Foreign Application Priority Data
Nov. 7, 2007    (JP)    ............................... 2007-289128

(51) Int. Cl.
G02B 7/02    (2006.01)
G02B 13/18    (2006.01)
G02B 3/02    (2006.01)

(52) U.S. Cl. ...................................... 359/814; 357/719
(58) Field of Classification Search ................. 359/814, 359/824, 719
See application file for complete search history.

(56) References Cited

FOREIGN PATENT DOCUMENTS

| CN | 1659634 | 8/2005 |
|---|---|---|
| JP | 2001-101687 | 4/2001 |
| WO | WO 03/102929 | 12/2003 |

*Primary Examiner*—Alicia M Harrington
(74) *Attorney, Agent, or Firm*—Antonelli, Terry, Stout & Kraus, LLP.

(57) ABSTRACT

An objective lens actuator which drives an objective lens in a focusing direction and a tracking direction, so as to focus lights on a recording surface of an optical disc, as a recording medium of information. The objective lens actuator includes a magnet, a lens holder which is configured to hold the objective lens thereon, and four pieces of tracking coils which are disposed in a line on a side surface of the lens holder for holding the objective lens thereon, facing to the magnet.

12 Claims, 8 Drawing Sheets understand # OBJECTIVE LENS ACTUATOR AND A DISC APPARATUS USING THE SAME THEREIN

BACKGROUND OF THE INVENTION

The present invention relates to an objective lens actuator to be used in an optical disc apparatus for reproducing or recording information onto or from a recording surface of an optical disc.

In an optical disc apparatus for recording information onto a disc-like information recording medium or reproducing information recording thereon, there is mounted an objective lens actuator for actuating or driving an objective lens in a focusing direction and a tracking direction, so as to record or reproduce the information, correctly, following a tack on the optical disc.

In general, such the objective lens actuator is built up with, a magnetic circuit made of a yoke and a permanent magnet, a moving part attached with an objective lens thereon, a holder for holding this moving part thereon, and a support member for elastically supporting the moving part with respect to the holder. Onto the moving part are attached a focusing coil and a tracking coil, wherein the moving part is actuated or driven in the focusing direction through an electromagnetic force generated due to an effect of flux from the permanent magnet attached on a yoke when supplying current into the focusing coil. In the similar manner, the moving part is driven in the tracking direction through an electromagnetic force generated due to the effect of flux from the permanent magnet attached on the yoke when supplying current into the tracking coil.

The density of magnetic flux effecting upon the coil is almost uniform at a central portion of the permanent magnet, but it becomes small, gradually, in a peripheral portion of the permanent magnet. If the moving part is operated or actuated to locate in such an area where the magnetic flux density is not uniform, then a change is caused in a magnitude of the electromagnetic force generating on the coil, then a moment of rotation is produced around a center of gravity of the moving part.

Explanation will be given on this principle, by referring to FIG. 10 for showing the typical structures of the tracking coils 737$r$ and 737$l$ and the permanent magnet 736$c$ of the objective lens actuator.

FIG. 10 is a side view for showing the force, which is generated on the tracking coil, and also the moment around an "x"-axis due to that force, when the moving part is actuated in a "z" direction, within the objective lens actuator of the conventional art.

As is shown in FIG. 10, when supplying current into the tracking coils 737$r$ and 737$l$ under the condition that the moving part is actuated by "$\Delta z$" into the "z" direction, an unbalance is generated in the magnetic flux density between the position on upper sides of the tracking coils 737$r$ and 737$l$ and lower sides thereof, and there are remaining the magnetic forces, respectively, i.e., (Ftl3-Ftl2) downwards in the "z" direction on the tracking coil 737$l$ and (Ftr3-Ftr2) upwards in the "z" direction on the tracking coil 737$r$. As a result thereof, the moment "M" acts onto the moving part, rotating around the "x"-axis.

This rotation moment comes into a cause of reason of tilt of the objective lens. Since the tilt of the objective lens results into generation of an aberration, and thereby deterioration of recording quality and a reproduced signal, therefore it is necessary to suppress the tilt of the objective lens.

For such the problem of the tilt of the objective lens, there is already known an objective lens actuator for acting on the tracking coils and/or the focusing coil, wherein the magnet (hereinafter, being called, "a permanent magnet") is determined to be in such a configuration that the moments due to the electromagnetic force to tilt the objective lens substantially offset or cancel each other (i.e., an example shown in the following Patent Document 1). With this, the moment rotating around the center of gravity of the moving part, which is produced due to the electromagnetic force generated in the tracking coils, and the moment rotating around the center of gravity of the moving part, which is produced due to the electromagnetic force generated in the focusing coil, are cancelled with each other, and thereby preventing or protecting the objective lens from the tilt thereof.

[Patent Document 1] Japanese Patent Laying-Open No. 2001-101687 (2001) (see claim 1 and FIGS. 1 to 5).

BRIEF SUMMARY OF THE INVENTION

With the conventional art mentioned above, however, since it uses both, i.e., the moment rotating around the center of gravity of the moving part, which is produced due to the electromagnetic force generated in the tracking coils, and the electromagnetic force, which is generated in the focusing coil, there is a possibility that the rotation moments cannot be cancelled with each other, each trying to tilt the objective lens, in particular, when the moving part operates into only one of the tracking direction and the focusing direction.

Then, an object of the present invention is to provide an objective lens actuator having a small tilt of the objective lens thereof.

The object mentioned above, according to the present invention, is accomplished by an objective lens actuator, for driving an objective lens in a focusing direction and a tracking direction, so as to focus lights on a recording surface of an optical disc, as a recording medium of information, comprising: a magnet; a lens holder, which is configured to hold said lens thereon; and four (4) pieces of tracking coils are disposed in a line on a side surface of said lens holder for holding said objective lens thereon, facing to said magnet.

Also, the object according to the present invention is accomplished by an objective lens actuator, for driving an objective lens in a focusing direction and a tracking direction, so as to focus lights on a recording surface of an optical disc, as a recording medium of information, comprising: magnets, which are disposed on two (2) surfaces putting said objective lens therebetween; a lens holder, which is configured to hold said lens thereon; and four (4) pieces of tracking coils are disposed in a line on each of two (2) side surfaces of said lens holder for holding said objective lens thereon, facing to said magnets.

Also, the object according to the present invention is accomplished by the objective lens actuator described in the above, wherein said magnet is disposed one by one at positions inner than outer sides of two (2) pieces of tracking coils lying on an outside far from said objective lens among said four (4) pieces of tracking coils, and outer than inner sides of two (2) pieces of tracking coils lying in an inside near to said objective lens.

Also, the object according to the present invention is accomplished by the objective lens actuator described in the above, wherein said four (4) pieces of tracking coils are connected in series, lengths of coil wires per one (1) turn of said four (4) pieces of tracking coils are equal to each other, and the number of turns of two (2) pieces of tracking coils lying on an outside far from said objective lens among said four (4) pieces of tracking coils is less than the number of turns of two (2) pieces of tracking coils lying in an outside near to said objective lens among said four (4) pieces of tracking coils.

Also, the object according to the present invention is accomplished by the objective lens actuator described in the above, wherein said four (4) pieces of tracking coils are connected in series, lengths of coil wires per one (1) turn and the number of turns of said four (4) pieces of tracking coils are equal to each other, and distance between two (2) pieces of tracking coils lying on an outside far from said objective lens among said four (4) pieces of tracking coils and the magnet facing to those is longer than distance between two (2) pieces of tracking coils lying in an inside near to said objective lens among said four (4) pieces of tracking coils and the magnet facing to those.

Also, the object according to the present invention is accomplished by the objective lens actuator described in the above, wherein said four (4) pieces of tracking coils are connected in series, length of coil wire locating in said focusing direction of two (2) pieces of tracking coils lying on an outside far from said objective lens among said four (4) pieces of tracking coils is longer than length of coil wire locating in said focusing direction of two (2) pieces of tracking coils lying in an inside near to said objective lens among said four (4) pieces of tracking coils, and the number of turns of two (2) pieces of tracking coils lying on the outside far from said objective lens among said four (4) pieces of tracking coils is less than the number of turns of two (2) pieces of tracking coils lying in the inside near to said objective lens among said four (4) pieces of tracking coils.

Also, the object according to the present invention is accomplished by the objective lens actuator described in the above, wherein said four (4) pieces of tracking coils are divided into two groups, two (2) pieces of tracking coils on an outside far from said objective lens among said four (4) pieces of tracking coils and two (2) pieces of tracking coils in an inside to said objective lens among said four (4) pieces of tracking coils, said two (2) groups of tracking coils are connected with, in parallel, lengths of coil wires per one (1) turn and numbers of turns of said four (4) pieces of tracking coils are equal to each other, and diameter coil wire of two (2) pieces of tracking coils lying on an outside far from said objective lens among said four (4) pieces of tracking coils is smaller than diameter coil wire of two (2) pieces of tracking coils lying in an inside near to objective lens among said four (4) pieces of tracking coils.

According to the present invention, since the rotation moment, which is generated by two (2) pieces of tracking coils lying in an inside near to the objective lens among four (4) pieces of tracking coils is in opposite to the rotation moment, which is generated by two (2) pieces of tracking coils lying in an outside far from the objective lens among four (4) pieces of tracking coils, and therefore the rotation moment acting upon the four (4) pieces of tracking coils as a whole comes to be small. Accordingly, it is possible to provide the objective lens actuator having small tilt of the objective lens thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

Embodiment 1

Figure 1:
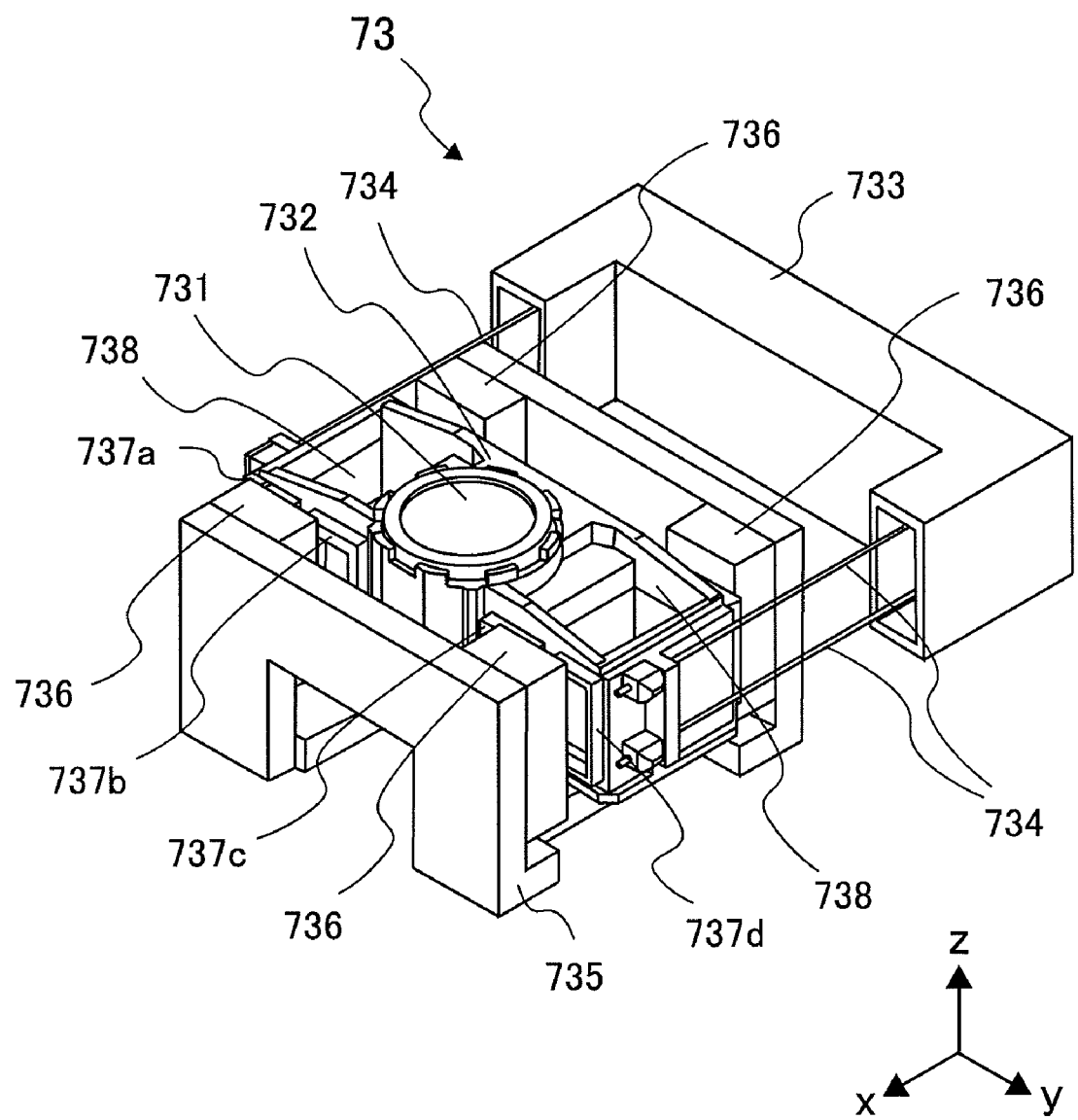
FIG. 1 is a perspective view of an objective lens actuator, according to an embodiment of the present invention.

FIG. 1 is a perspective view of an objective lens actuator 73, according to the present invention.

In FIG. 1, the "x"-axis direction thereof indicates a jitter direction, i.e., a tangential direction of an optical disc not shown in the figure, the "y"-axis direction thereof a tracking direction, i.e., a radial direction of the optical disc, and "z"-axis direction thereof a focusing direction, i.e., a direction of an optical axis of an objective lens 731, respectively. Also, definitions are made therein, the direction for the objective lens 731 to approach to the optical disc not shown in the figure is "up" while "down" far away from that.

The objective lens actuator 73 comprises a magnetic circuit, a moving part, onto which the objective lens 731 is attached, a holder 733 for holding this moving part therein, support members 734 for elastically supporting the moving part with respect to the holder 733, a yoke 735, and permanent magnets 736. The wire-like support members 734 are fixed in the vicinity of an end surface of the holder 733 at one ends thereof, and are fixed on both ends of a lens holder 732 at the other ends thereof, with using a solder or the like, for example. The objective lens 731 is attached on an upper surface of the lens holder 732. Also, onto the lens holder 732 are attached tracking coils 737a to 737h (however, those 737a to 737h are not shown in the figure since they cannot be seen in FIG. 1), lying between the objective lens 731, and a focusing coil 738.

Herein, the objective lens 731, the lens holder 732, the tracking coils 737a to 737h and the focusing coil 738 build up the moving part. Thus, this moving part movers with respect to the holder 733. Explanation will be made on the more detailed structures of the embodiment 1 of the present invention, by referring to FIGS. 2 and 3.

Figure 2:
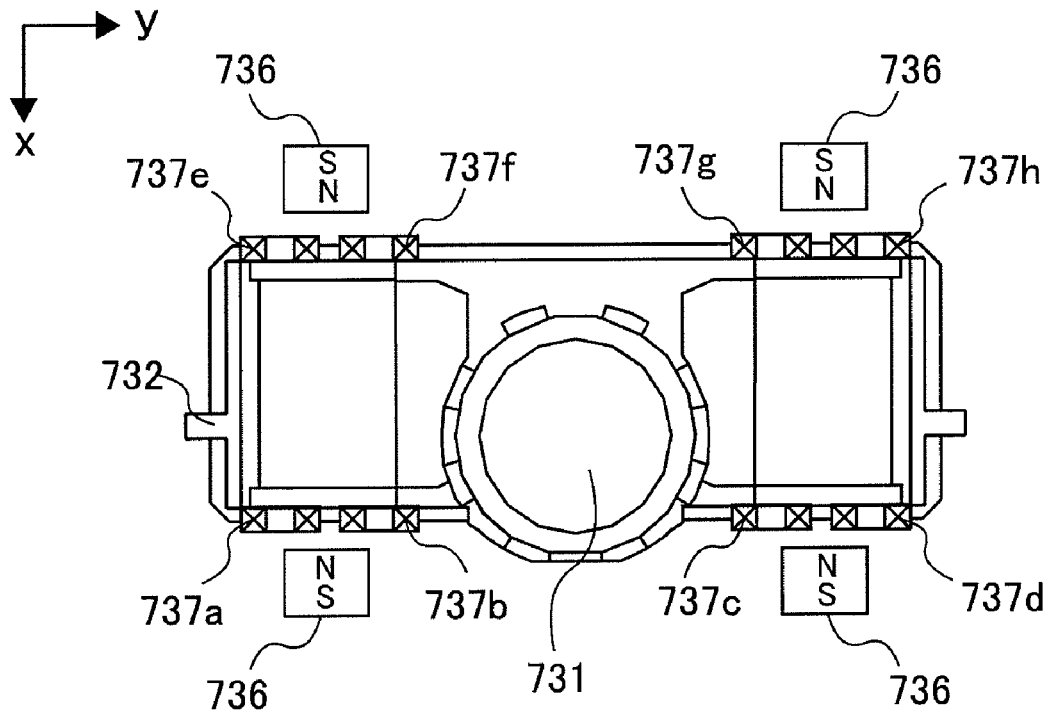
FIG. 2 is an upper view of the objective lens actuator, according to the embodiment of the present invention.

FIG. 2 is an upper view for showing the moving part and the permanent magnets 736 building up the objective lens actuator 73, for showing the example 1 of the present invention.

Figure 3:
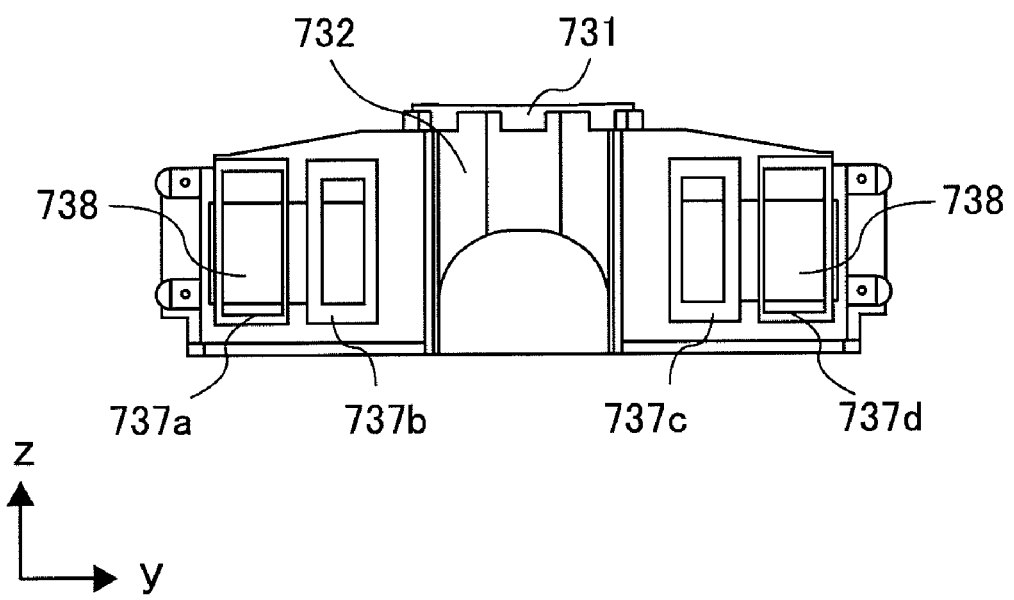
FIG. 3 is a side view of a moving part of the objective lens actuator, according to the embodiment of the present invention.

FIG. 3 is a side view for showing the moving building up the objective lens actuator 73, also for showing the example 1 of the present invention.

A first feature of the present embodiment lies in that, as is shown in FIG. 2, four (4) pieces of the tracking coils are arranged or disposed in a line, on each of the side surfaces of the lens holder 732, facing to the permanent magnets 736, respectively. A second feature of the present embodiment lies in that, on each side surface is disposed one (1) piece of the permanent magnets 736, each having a single pole and the same characteristic, i.e., four (4) pieces in total thereof at positions, being inner than the outer sides of two (2) pieces of the tracking coils 737a and 737d or 737e and 737h on an outside far from the objective lens, among the four (4) pieces of the tracking coils, and outer than the inner sides of two (2) pieces of the tracking coils 737b and 737c or 737f and 737g in an inside near to the objective lens, among the four (4) pieces of the tracking coils.

Though N-poles of all the permanent magnets 736 are facing to the coils in the figure, but since it is possible to control the direction of the driving forces depending upon the direction of currents flowing in the coils, then S-poles of all the permanent magnets may be direct to face to the coils. And a third feature of the present embodiment lies, as is shown in FIG. 3, the four (4) pieces of the tracking coils are connected in series on each side surface, wherein length of coil wire per one (1) turn is equal to each other for four (4) pieces of the tracking coils, and the number of turns of the outer two (2) pieces of the tracking coils 737a and 737d far from the objective lens is set to be smaller than the number of turns of the inner two (2) pieces of the tracking coils 737b and 737c near to the objective lens.

Explanation will be given about the mechanisms for suppressing an tilt of the objective lens 731 with the objective lens actuator 73, which is built up in such the structures, by referring to FIGS. 4A to 5B.

Figure 4A:
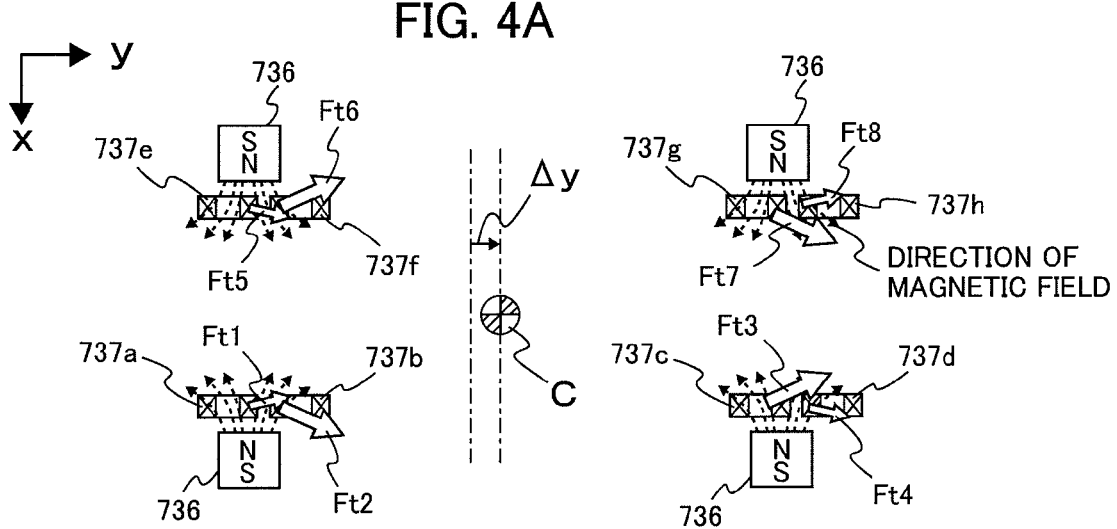
FIGS. 4A to 4C are upper views for showing forces, which are generated in tracking coils when the moving part operates in a "y" direction, and also moments rotating around a "z"-axis, which are generated due to those forces, within the objective lens actuator of the present invention.
Figure 4B:
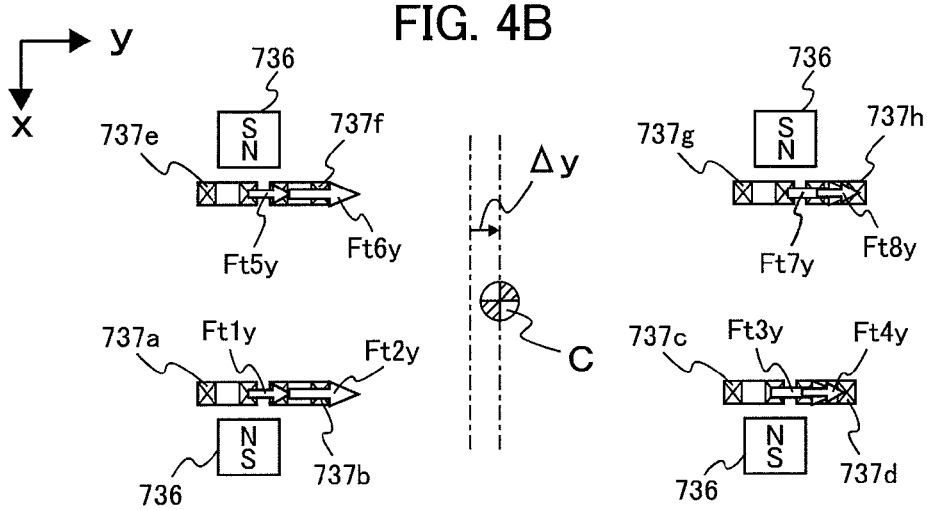

FIG. 4A illustrates therein the directions of magnetic fields in the vicinity of the tracking coil, under the condition where the moving part of the objective lens actuator 73 operates by Δy in "y" direction from a neutral condition thereof, and also electromagnetic forces Ft1 to Ft8, which are produced on a side in parallel with "z"-axis of the tracking coil when driving the tracking coil in this condition. FIG. 4B illustrates therein only a component in "y" direction of the electromagnetic force in the tracking direction, which is produced along a side of the tracking coil shown in FIG. 4A in parallel with "z"-axis, and FIG. 4C illustrates therein only a component in "x" direction of the electromagnetic force in the tracking direction, which is produced along the side of the tracking coil shown in FIG. 4A in parallel with "z"-axis.

As shown in FIG. 4A, i.e., when the objective lens 731 is operated by Δy into "y" direction, the side in parallel with the "z"-axis of the tracking coil is disposed at a position coming out from a center of the permanent magnet 736. At the position coming out from the center of the permanent magnet 736, also the direction of magnetic field is not perpendicular to "x"-axis, but has an tilt of a certain angle. The electromagnetic forces Ft1 to Ft8 are generated along the sides of the tracking coils in parallel with "z" axis, when supplying current into the tracking coil in this condition, have components in "x" direction in addition to the components in "y" direction.

Among of those, the electromagnetic forces Ft1y to Ft8y in "y" direction, as shown in FIG. 4B, are driving forces for driving or actuating the moving part in the tracking direction. With those electromagnetic forces Ft1y to Ft8y in this "y" direction, since the tracking coils 737a to 737d and the tracking coils 737e to 737h are disposed at positions, being symmetric with respect to a line to the axis in parallel with "y" axis passing through a center of gravity of the moving part, then the rotation moment due to the electromagnetic forces Ft1y to Ft4y in "y" direction, which are generated in the tracking coils 737a to 737d, are balanced with the rotation moment due to the electromagnetic forces Ft5y to Ft8y in "y" direction, which are generated in the tracking coils 737e to 737h, and therefore there is hardly generated moment for rotating the moving part.

Figure 4C:
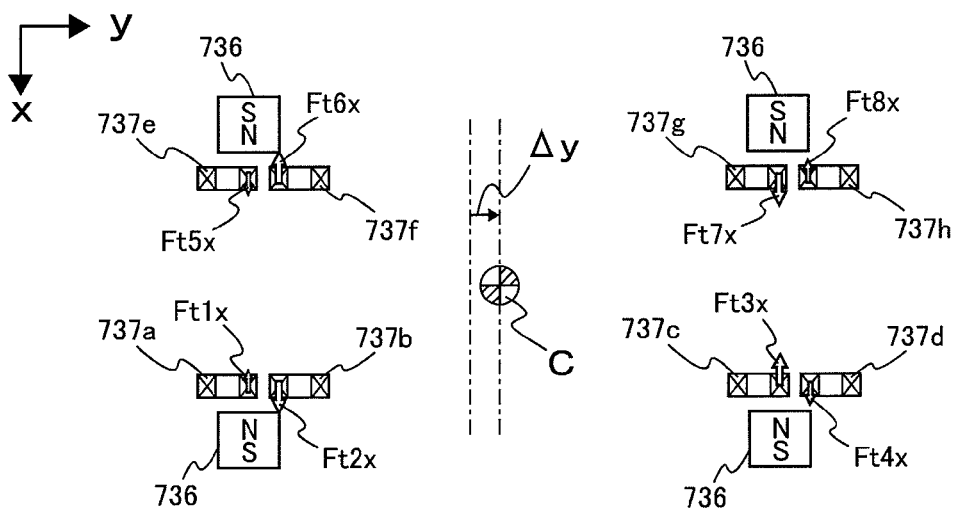

In the similar manner, as is shown in FIG. 4C, also with the electromagnetic forces Ft1x to Ft8x in "x" direction, since the tracking coils 737a, 737b, 737e and 737f and the tracking coils 737c, 737d, 737g and 737h are disposed at positions, being symmetric with respect to a line to the axis in parallel with "x" axis passing through a center of gravity of the moving part, then the rotation moment due to the electromagnetic forces Ft1x, Ft2x, Ft5x and Ft6x in "x" direction, which are generated in the tracking coils 737a, 737b, 737e and 737f, are balanced with the rotation moment due to the electromagnetic forces Ft3x, Ft4x, Ft7x and Ft8x in "x" direction, which are generated in the tracking coils 737c, 737d, 737g and 737h, and therefore there is hardly generated moment for rotating the moving part. In this manner, according to the first and the second features of the present embodiment, since it is possible to reduce the rotation moment produced on the tracking coils accompanying the driving forces in the tracking direction even when the objective lens is operated, therefore it is possible to bring the tilt of the objective lens to be small.

Figure 5A:
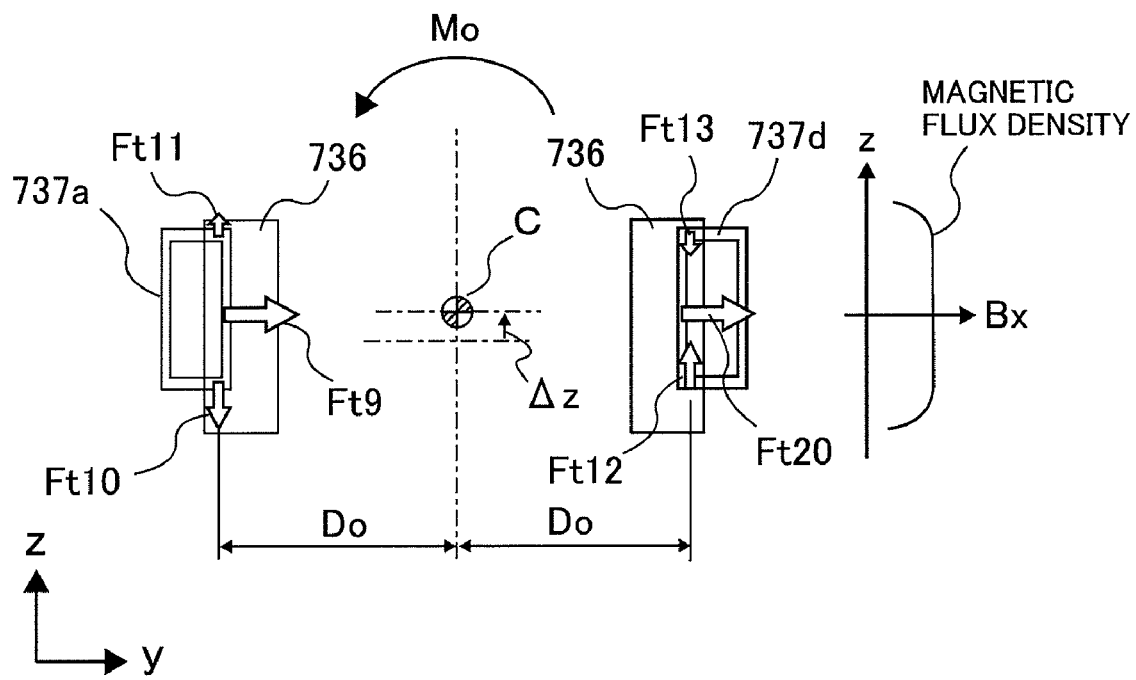
FIGS. 5A and 5B are upper views for showing forces, which are generated in tracking coils when the moving part operates in a "z" direction, and also moments rotating around an "x"-axis, which are generated due to those forces, within the objective lens actuator of the present invention.
Figure 5B:
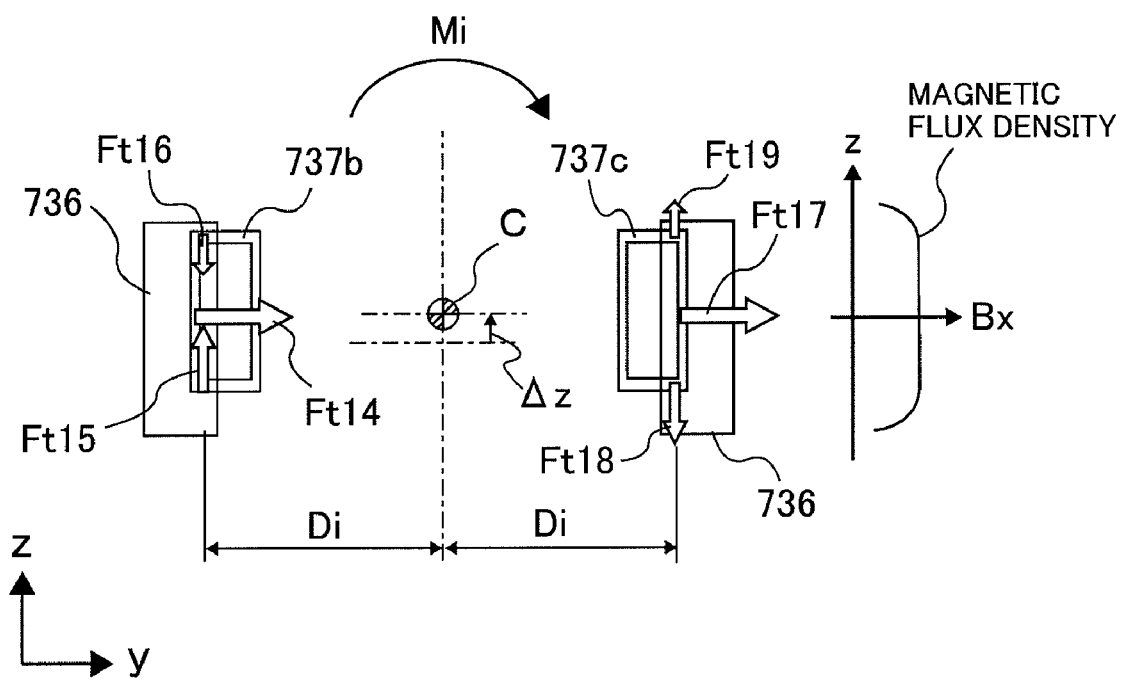

FIGS. 5A and 5B illustrate therein a distribution condition of magnetic flux density in "x" direction due to the permanent magnets 736 of the objective lens actuator 73 according to the present embodiment, the electromagnetic forces Ft9, Ft20, Ft14 and Ft17 in the tracking direction, which are produced along the sides of the tracking coils in parallel with "z"-axis, when driving the tracking coils under the condition that the moving part is operated by Δz in "z" direction from the neutral condition, and the electromagnetic forces Ft10, Ft11, Ft13, Ft12, Ft16, Ft15, Ft19 and Ft18 in the focusing direction, which are produced along the sides of the tracking coils in parallel with "y"-axis accompanying with those, and further rotation moments Mo and Mi around "x"-axis, which are produced due to those electromagnetic forces.

In particular, FIG. 5A illustrates the electromagnetic forces Ft9 and Ft20, which are produced along the sides of the outer two (2) pieces of the tracking coils 737a and 737d in parallel with "z"-axis far from the objective lens, among the four (4) pieces of the tracking coils 737a to 737d, the electromagnetic forces Ft10, Ft11, Ft12 and Ft13 in the focusing direction, which are produced along the sides of the tracking coils in parallel with "y"-axis accompanying with those, and only the rotation moment "Mo" around the "x"-axis, which is produced by those electromagnetic forces Ft10, Ft11, Ft12 and Ft13, while FIG. 5B illustrates the electromagnetic forces Ft14 and Ft17 in the tracking direction, which are produced along the sides of two (2) pieces of tracking coils 737b and 737c in parallel with "z"-axis in the inside near to the objective lens 731 among the four (4) pieces of the tracking coils 737a to 737d, the electromagnetic forces Ft15, Ft16, Ft18 and Ft19 in the focusing direction, which are produced along the sides of the tracking coils in parallel with "y"-axis accompanying with those, and only the rotation moment Mi around the "x"-axis, which is generated due to those electromagnetic forces Ft15, Ft16, Ft18 and Ft19.

As illustrated in the figures, when supplying current into the tracking coils in the condition that the objective lens 731 is operated only by Δz in "z"-direction, then the tracking coils generate the electromagnetic forces Ft9, Ft20, Ft14 and Ft17 along the sides in parallel with "z"-axis thereof, and at the same time, accompanying with this, also generate the electromagnetic forces Ft10, Ft11, Ft13, Ft12, Ft16, Ft 15, Ft 19 and Ft18 in "z" direction, i.e., the focusing direction, along the sides of the tracking coils in parallel with "x"-axis.

Herein, the electromagnetic force "F" can be expressed as below, when current "I" flows in the coil having a length "L" lying within the magnetic flux density "B".

$$F = B \times I \times L \quad \text{(Equation 1)}$$

Firstly, in relation to the electromagnetic forces Ft9, Ft20, Ft14 and Ft17 in "y" direction, the influences thereof will be mentioned.

In the present embodiment, since four (4) pieces of the tracking coils 737a to 737d are connected in series, current flowing through the coils is equal to each other. Also, since the characteristics of the permanent magnets 736 are same, then the magnetic flux density is also equal to each other at the position along the side of each tracking coil in parallel with "z"-axis facing to the permanent magnets 736. In this case, the electromagnetic force in "y" direction, which is generated in each of the tracking coils 737a to 737d is determined by the sum total of lengths of the sides of each tracking coil in parallel with "z"-axis facing to the permanent magnets 736, from the equation (1).

Further, with the present embodiment, since the total sum of lengths of sides of each tracking coil in parallel with "z"-axis facing to the permanent magnets 736 is equal to the length of the coil wire of four (4) pieces of the tracking coils per one (1) turn thereof, and the number of turns of the outer two (2) pieces of tacking coils 737a and 737d far from the objective lens 731 is less than the number of turns of two (2) pieces of the tracking coils of the inside near to the objective lens 731, among the four (4) pieces of the tracking coils 737a to 737d, the total sum of lengths of the sides of the two (2) pieces of tracking coils 737a and 737d on the outside in parallel with "z"-axis facing to the permanent magnets 736 is shorter than the total sum of lengths of the sides of the inner two (2) pieces of tracking coils 737b and 737c in parallel with "z"-axis facing to the permanent magnets 736. As a result thereof, the electromagnetic forces Ft9 and Ft20, which are generated in the outer two (2) pieces of tracking coils 737a and 737d, comes to be smaller than the electromagnetic forces Ft14 and Ft17, which are generated in the two (2) pieces of tracking coils 737a and 737d in the inside. Since this electromagnetic force in "y" direction is a driving force for driving the moving part in the tracking direction, and a point of action of this force is located almost on a straight line in parallel with "y"-axis passing through the center of gravity of the moving part on a "y-z" plane, then there is hardly generated a moment for rotating the moving part. Next, the influences thereof will be mentioned, in relation to the electromagnetic forces in "z" direction.

Although the magnetic flux density in "x" direction produced by the permanent magnets 736 is almost uniform or flat in a central portion of the permanent magnets 736, as is shown on the graphs at the right-hand side in FIGS. 5A and 5B, respectively, but it is reduced to be small in the peripheral portions, i.e., the upper and the lower ends of the permanent magnets 736, then unbalance is produced in the magnetic flux density between the position on the upper side and the position on the lower side of each tracking coil in parallel with "x"-axis. Therefore, the electromagnetic force generated on each of the tracking coils 737a to 737d in "z" direction can be determined, when currents flowing in the coils are equal as in the present embodiment, by the total sum of the lengths of each tracking coil on each side thereof in parallel with "x"-axis facing to the permanent magnets 736, and also the magnetic flux density at that position, from the equation (1). As a result thereof, the electromagnetic forces act, respectively, i.e., downwards in "z" direction in balance (i.e., Ft10-Ft11), upon the outer tracking coil 737a, upwards in "z" direction in balance (i.e., Ft12-Ft13), upon the outer tracking coil 737d. In the similar manner, the electromagnetic forces act, respectively, i.e., upwards in "z" direction in balance (i.e., Ft15-Ft16), upon the tracking coil 737b in the inside, downwards in "z" direction in balance (i.e., Ft18-Ft19), upon the tracking coil 737c in the inside.

Due to the magnetic forces generated on those tracking coils in "z" direction, the rotation moment acts on the moving part around "x" axis. However, since the rotation moment "Mo" due to the electromagnetic forces (Ft10-Ft11) and (Ft12-Ft13) generated on the outer tracking coils 737a and 737d is in opposite in the direction thereof to the rotation moment "Mi" due to the electromagnetic forces (Ft15-Ft16) and (Ft18-Ft19) generated on the tracking coils 737b and 737c in the inside, therefore it is enough to bring the rotation moments Mo and Mi to be equal to each other in the magnitude thereof, for the purpose of reducing the rotation moments acting upon the tracking coils 737a to 737d to tilt the moving portion, to be small.

Herein, the magnitude of the rotation moment can be presented by the product of the electromagnetic force and the distance from the point of action of that electromagnetic force up to the straight line in parallel with "z"-axis passing through the center of gravity of the moving part on the "y-z" plane. The distance from the point of action of that electromagnetic force, up to the straight line in parallel with "z"-axis passing through the center of gravity of the moving part, on this "y-z" plane, is "Do", for the outer two (2) pieces of tracking coils 737a and 737d on, being larger than "Di" of the inner two (2) pieces of tracking coils 737b and 737c.

Accordingly, it is enough to determine the electromagnetic forces (Ft10-Ft11) and (Ft12-Ft13) in "z" direction, which are generated on the outer two (2) pieces of tracking coils 737a and 737d lying far from the center of gravity of the moving part, to be smaller than the electromagnetic forces (Ft15-Ft16) and (Ft18-Ft19) in "z" direction, which are generated on the inner two (2) pieces of tracking coils, and thereby bringing a ratio between the magnitude of the electromagnetic forces (Ft10-Ft11) and (Ft12-Ft13) in "z" direction, which are generated on the tracking coils on the outside, and the magnitude of the electromagnetic forces (Ft15-Ft16) and (Ft18-Ft19) in "z" direction, which are generated on the inner tracking coils, to be equal to a ratio between the distance "Di", from the point of action of the electromagnetic force in "z" direction generated on the inner tracking coils up to the straight line in parallel with "z"-axis passing through the center of gravity of the moving part on the "y-z" plane, and the distance "Do", from the point of action of the electromagnetic force in "z" direction generated on the outer tracking coils up to the straight line in parallel with "z"-axis passing through the center of gravity of the moving part on the "y-z" plane.

In the present embodiment, the length of coil wire per one (1) turn is equal to, among the four (4) pieces of tracking coils, and the number of turns of the outer two (2) pieces of tracking coils 737a and 737d is determined to be smaller than the number of turns of the inner two (2) pieces of tracking coils 737b and 737c, and thereby, the total sum of lengths of the sides of the outer two (2) pieces of tracking coils 737a and 737d, in parallel with "y"-axis facing to the permanent magnets 736, is smaller than the total sum of lengths of the sides of the inner two (2) pieces of tracking coils 737b and 737c, in parallel with "y"-axis facing to the permanent magnets 736.

As a result thereof, the electromagnetic forces (Ft10-Ft11) and (Ft12-Ft13) in "z" direction, which are generated in the outer two (2) pieces of tacking coils 737a and 737d, comes to be smaller than the electromagnetic forces (Ft15-Ft16) and (Ft18-Ft19) in "z" direction, which are generated in the inner two (2) pieces of tacking coils 737b and 737c. With this, it is possible to bring the ratio between the magnitude of the electromagnetic forces (Ft10-Ft11) and (Ft12-Ft13) in "z" direction, which are generated in the outer tacking coils, and the magnitude of the electromagnetic forces (Ft15-Ft16) and (Ft18-Ft19) in "z" direction, which are generated in the inner tacking coils, to be equal to the ratio between the distance "Di", from the point of action of the electromagnetic force in "z" direction generated on the tracking coils in the inside up to the straight line in parallel with "z"-axis passing through the center of gravity of the moving part on the "y-z" plane, and the distance "Do", from the point of action of the electromagnetic force in "z" direction generated on the outer tracking coils up to the straight line in parallel with "z"-axis passing through the center of gravity of the moving part on the "y-z" plane, and thereby bringing the magnitude of the rotation moment "Mo" by the outer two (2) pieces of tracking coils 737a and 737d to be equal to the rotation moment "Mi" by the inner two (2) pieces of tracking coils 737b and 737c.

Accordingly, the rotation moments "Mo" and "Mi" negate each other, since they are almost same in the magnitude and are opposite to each other in the directions thereof, and therefore the rotation moments come to be small, acting upon the tracking coils 737a to 737d, to try to tilt the moving part.

This effect can be obtained, in the similar manner, with the tracking coils 737e to 737h, which are attached on a side surface of the opposite side of the lens holder 732, facing to the permanent magnets 736. As was mentioned above, it is possible to make the tilt of the objective lens 731 small even when the objective lens operates.

Embodiment 2

Figure 6:
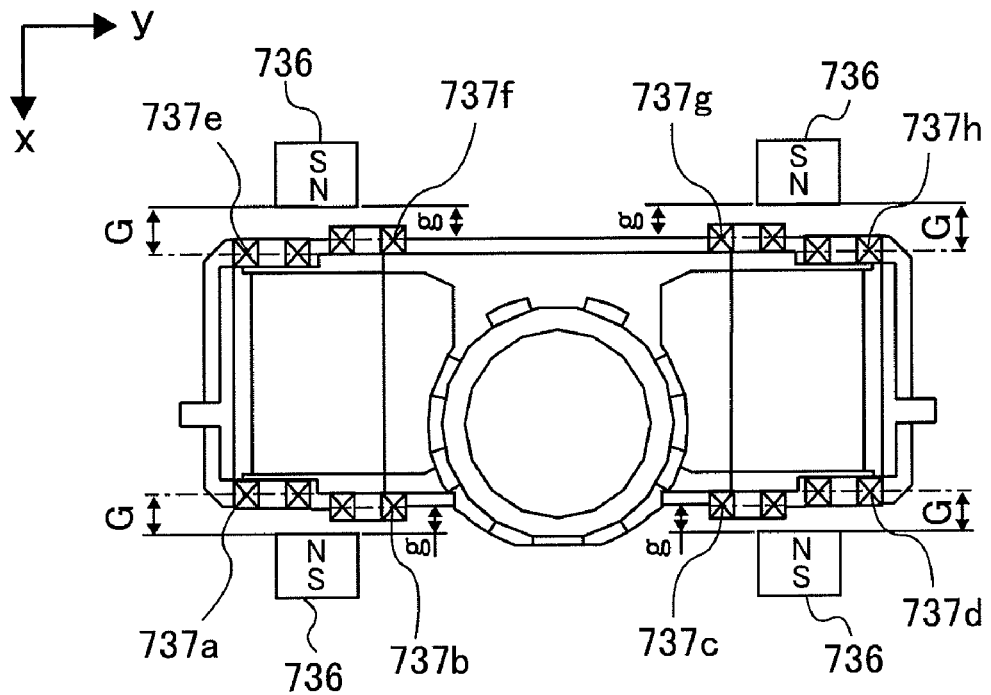
FIG. 6 is an upper view of the moving part and permanent magnets of the objective lens actuator, according to other embodiment of the present invention.

FIG. 6 is an upper view for showing the moving part and the permanent magnets 736, building up the objective lens actuator 73, according to a second embodiment (i.e., an embodiment 2) of the present invention.

In FIG. 6, although as the third feature of the embodiment 1 mentioned above lies in that the four (4) pieces of tracking coils are connected in series, wherein the length of the coil wire per one (1) turn is equal to each other among the four (4) pieces of tracking coils, and the number of turns of the outer tracking coils 737a and 737d far from the objective lens 731 among the four (4) pieces of tracking coils 737a to 737d is smaller than the number of turns of the inner tracking coils 737b and 737c near to the objective lens 731 among the four (4) pieces of tracking coils 737a to 737d: however, according to the present embodiment, it is characterized in that the four (4) pieces of tracking coils are connected in series, wherein the length of the coil wire per one (1) turn is equal to each other among the four (4) pieces of tracking coils, a distance "G" between the outer two (2) pieces of tracking coils 737a and 737d far from the objective lens 731, among the four (4) pieces of tracking coils 737a to 737d, and the permanent magnets 736 facing thereto is determined to be larger than a distance "g" between the inner two (2) pieces of tracking coils 737b and 737c near to the objective lens 731, among the four (4) pieces of tracking coils 737a to 737d, and the permanent magnets 736 facing thereto.

The other structures of the present embodiment are similar to those of the embodiment 1, and therefore the detailed explanation thereof will be omitted herein.

With such the structures in this manner, it is possible to bring the magnetic flux density, at the position along the sides of the outer two (2) pieces of tracking coils 737a and 737d in parallel with "x"-axis facing to the permanent magnets 736, to be smaller than the magnetic flux density, at the position along the sides of the inner two (2) pieces of racking coils 737b and 737c in parallel with "y"-axis facing to the permanent magnets 736.

From the equation (1) mentioned above, as shown in the present embodiment, the current flowing through the four (4) pieces of tracking coils 737a to 737d, and the electromagnetic forces in "z" direction, which are generated on the tracking coils 737a to 737d, respectively, in case when the total sums of lengths of the sides of the four (4) pieces of the tracking coils 737a to 737d in parallel with "z"-axis facing to the permanent magnets 736 are equal to each other, are determined by the magnetic flux density at portion of the sides in parallel with "x"-axis facing to the permanent magnets 736 on each of the tracking coils 737a to 737d. Therefore, it is possible to bring the electromagnetic forces (Ft10-Ft11) and (Ft12-Ft13) in "z" direction, which are generated on the outer two (2) pieces of tracking coils 737a and 737d, to be smaller than the electromagnetic forces (Ft15-Ft16) and (Ft18-Ft19) in "z" direction, which are generated on the inner two (2) pieces of tracking coils 737b and 737c.

With this, it is possible to bring the ratio between the magnitude of the electromagnetic forces (Ft10-Ft11) and (Ft12-Ft13) in "z" direction, which are generated on the outer tacking coils, and the magnitude of the electromagnetic forces (Ft15-Ft16) and (Ft18-Ft19) in "z" direction, which are generated on the inner tacking coils, to be equal to the ratio between the distance "Di", from the point of action of the electromagnetic force in "z" direction generated on the inner tracking coils up to the straight line in parallel with "z"-axis passing through the center of gravity of the moving part on the "y-z" plane, and the distance "Do", from the point of action of the electromagnetic force in "z" direction generated on the outer tracking coils up to the straight line in parallel with "z"-axis passing through the center of gravity of the moving part on the "y-z" plane, and thereby bringing the magnitude of the rotation moment "Mo" by the outer two (2) pieces of tracking coils 737a and 737d to be equal to the rotation moment "Mi" by the inner two (2) pieces of tracking coils 737b and 737c.

Accordingly, similar to the embodiment 1, the rotation moments "Mo" by the outer two (2) pieces of tracking coils 737a and 737d and "Mi" by the inner two (2) pieces of tracking coils 737b and 737c negate each other, since they are almost same in the magnitude and are opposite to each other in the directions thereof, and therefore the rotation moments come to be small, acting upon the tracking coils 737a to 737d, to try to tilt the moving part. This effect can be obtained, in the similar manner to that of the embodiment 1, with the tracking coils 737e to 737h, which are attached on a side surface of the opposite side of the lens holder 732, facing to the permanent magnets 736. With this, it is possible to make the tilt of the objective lens 731 small even when the objective lens operates.

Embodiment 3

Although as the third feature of the embodiment 1 mentioned above lies in that the four (4) pieces of tracking coils are connected in series, wherein the length of the coil wire per one (1) turn is equal to each other among the four (4) pieces of tracking coils, and the number of turns of the outer tracking coils 737a and 737d far from the objective lens 731 among the four (4) pieces of tracking coils 737a to 737d is smaller than the number of turns of the inner tracking coils 737b and 737c near to the objective lens 731 among the four (4) pieces of tracking coils 737a to 737d: however, according to the present embodiment, it is characterized in that the four (4) pieces of tracking coils are divided into two (2) of an outside and two (2) of an inside, wherein a pair of tracking coils of the outside one or the inside one are connected in parallel, the length of the coil wire per one (1) turn and the number of turns are equal to each other among the four (4) pieces of tacking coils, and the diameter of the coil wire of the outer two (2) pieces of tacking coils 737a and 737d far from the objective lens 731 among the four (4) pieces of tracking coils 737a to 737d is determined to be thinner than the diameter of the inner two (2) pieces of tracking coils 737b and 737c near to the objective lens 731 among the four (4) pieces of tracking coils 737a to 737d. The other structures of the present embodiment are similar to those of the embodiment 1, and therefore the detailed explanation thereof will be omitted herein.

With such the structures, it is possible to bring the current flowing into the outer two (2) pieces of tracking coils 737a and 737d to be smaller than the current flowing into the inner two (2) pieces of tracking coils 737b and 737c.

From the equation (1) mentioned above, the magnetic flux density on an upper and a lower sides of the tracking coil in parallel with "x"-axis due to the permanent magnets 736 having the same characteristics is equal to each other, respectively, on the upper and lower sides of the inner and the outer ones, and in case where the total sums of lengths of the sides in parallel with "x"-axis facing to the permanent magnets 736 are equal to each other among the four (4) pieces of tracking coils 737a to 737d, the electromagnetic force in "z" direction, which is generated on each of the tracking coils 737a to 737d, is determined by the current flowing in each of the tracking coils 737a to 737d, and therefore it is possible to bring the electromagnetic forces (Ft10-Ft11) and (Ft12-Ft13) in "z" direction, which are generated on the outer two (2) pieces of tracking coils 737a and 737d to be smaller than the electromagnetic forces (Ft15-Ft16) and (Ft18-Ft19) in "z" direction, which are generated on the inner two (2) pieces of tracking coils 737b and 737c.

With this, it is possible to bring the ratio between the magnitude of the electromagnetic forces (Ft10-Ft11) and (Ft12-Ft13) in "z" direction, which are generated in the outer tacking coils, and the magnitude of the electromagnetic forces (Ft15-Ft16) and (Ft18-Ft19) in "z" direction, which are generated in the inner tacking coils, to be equal to the ratio between the distance "Di", from the point of action of the electromagnetic force in "z" direction generated on the inner tracking coils up to the straight line in parallel with "z"-axis passing through the center of gravity of the moving part on the "y-z" plane, and the distance "Do", from the point of action of the electromagnetic force in "z" direction generated on the outer tracking coils up to the straight line in parallel with "z"-axis passing through the center of gravity of the moving part on the "y-z" plane, and thereby bringing the magnitude of the rotation moment "Mo" by the outer two (2) pieces of tracking coils 737a and 737d to be equal to the rotation moment "Mi" by the inner two (2) pieces of tracking coils 737b and 737c.

Accordingly, similar to the embodiment 1, the rotation moments "Mo" by the outer two (2) pieces of tracking coils 737a and 737d and "Mi" by the inner two (2) pieces of tracking coils 737b and 737c negate each other, since they are almost same in the magnitude and are opposite to each other in the directions thereof, and therefore the rotation moments come to be small, acting upon the tracking coils 737a to 737d, to try to tilt the moving part. This effect can be obtained, in the similar manner to that of the embodiment 1, with the tracking coils 737e to 737h, which are attached on the side surface of the opposite side of the lens holder 732, facing to the permanent magnets 736. With this, it is possible to make the tilt of the objective lens 731 small even when the objective lens operates.

Embodiment 4

Figure 7:
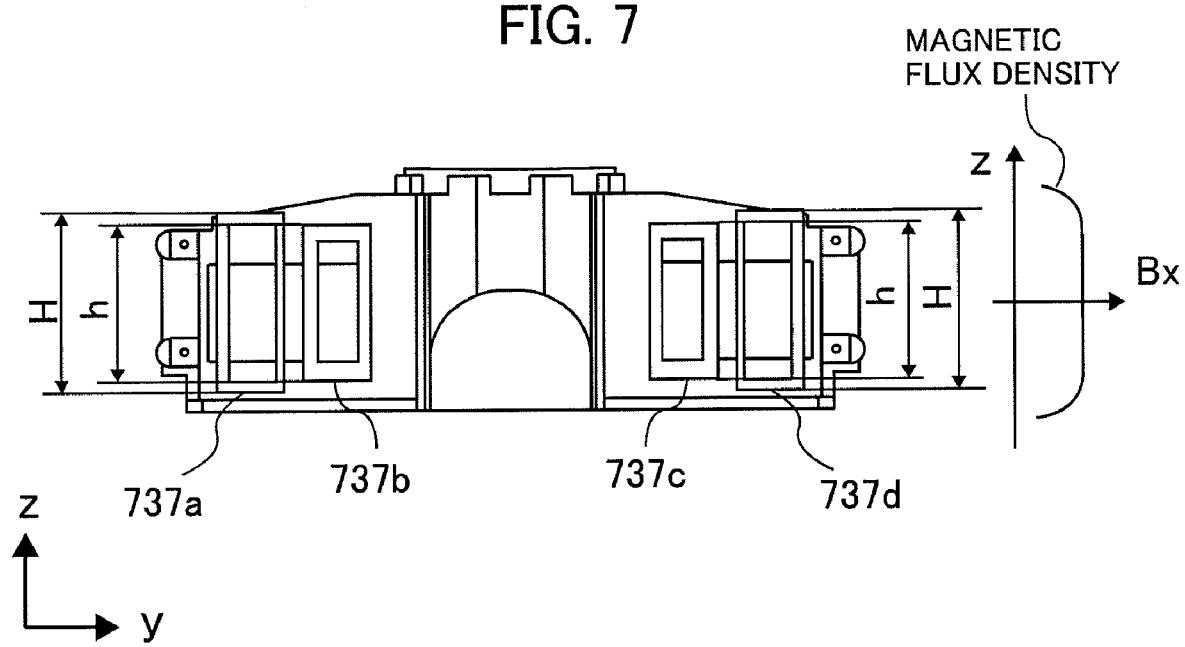
FIG. 7 is a side view of the moving part of the objective lens actuator, according to the other embodiment of the present invention.

In the present embodiment mentioned above, though only one is changed, i.e., the configurations, the positions, or the characteristics of the outer two (2) pieces of tracking coils 737a and 737d and the inner two (2) pieces of tracking coils 737b and 737c: however, as is shown in FIG. 7, it is also possible to connect the four (4) pieces of tacking coils in series, wherein the number of turns of the outer two (2) pieces of tracking coils 737a and 737d far from the objective lens 731 among the four (4) pieces of tracking coils 737a to 737d is set to be smaller than the number of turns of the inner two (2) pieces of tracking coils 737b and 737c near to the objective lens 731 among the four (4) pieces of tracking coils 737a to 737d, and also the lengths of the sides of the outer two (2) pieces of tracking coils 737a and 737d far from the objective lens 731 among the four (4) pieces of tracking coils 737a to 737d, in parallel with "z"-axis facing to the permanent magnets 736 are set to be longer than the lengths of the sides of the inner two (2) pieces of tracking coils 737b and 737c near to the objective lens 731 among the four (4) pieces of tracking coils 737a to 737d, in parallel with "z"-axis facing to the permanent magnets 736.

In this case, similar to the embodiment 1, in addition to reducing the number of turns of the outer two (2) pieces of tracking coils 737a and 737d less than the number of turns of the inner two (2) pieces of tracking coils 737b and 737c, the length "H" of the sides of the outer two (2) pieces of tracking coils 737a and 737d, in parallel with "z"-axis and facing to the permanent magnets 736 is set to be longer than the length "h" of the sides of the inner two (2) pieces of tracking coils 737b and 737c, in parallel with "z"-axis and facing to the permanent magnets 736, and thereby brining the sides of the outer two (2) pieces of tacking coils 737a and 737d, in parallel with "z"-axis and facing to the permanent magnets 736 to be far away from the central portion of the permanent magnet 736, to be disposed at the position where the magnetic flux density in "x" direction is small, as is shown in the right-hand side in FIG. 7, and thereby it is possible to bring the electromagnetic forces (Ft10-Ft11) and (Ft12-Ft13) in "z" direction, which are generated on the outer two (2) pieces of tracking coils 737a and 737d, to be smaller than the electromagnetic forces (Ft15-Ft16) and (Ft18-Ft19) in "z" direction, which are generated on the inner two (2) pieces of tracking coils 737b and 737c.

With this, it is possible to bring the ratio between the magnitude of the electromagnetic forces (Ft10-Ft11) and (Ft12-Ft13) in "z" direction, which are generated in the outer tacking coils, and the magnitude of the electromagnetic forces (Ft15-Ft16) and (Ft18-Ft19) in "z" direction, which are generated in the inner tacking coils, to be equal to the ratio between the distance "Di", from the point of action of the electromagnetic force in "z" direction generated on the inner tracking coils up to the straight line in parallel with "z"-axis passing through the center of gravity of the moving part on the "y-z" plane, and the distance "Do", from the point of action of the electromagnetic force in "z" direction generated on the outer tracking coils up to the straight line in parallel with "z"-axis passing through the center of gravity of the moving part on the "y-z" plane, and thereby bringing the magnitude of the rotation moment "Mo" by the outer two (2) pieces of tracking coils 737a and 737d to be equal to the rotation moment "Mi" by the inner two (2) pieces of tracking coils 737b and 737c.

Accordingly, the rotation moments "Mo" by the outer two (2) pieces of tracking coils 737a and 737d and "Mi" by the inner two (2) pieces of tracking coils 737b and 737c negate each other, since they are almost same in the magnitude and are opposite to each other in the directions thereof, and therefore the rotation moments come to be small, acting upon the tracking coils 737a to 737d, to try to tilt the moving part. This effect can be obtained, in the similar manner to that of the embodiment 1, with the tracking coils 737e to 737h, which are attached on the side surface of the opposite side of the lens holder 732, facing to the permanent magnets 736. With this, it is possible to make the tilt of the objective lens 731 small even when the objective lens operates.

Embodiment 5

Figure 8:
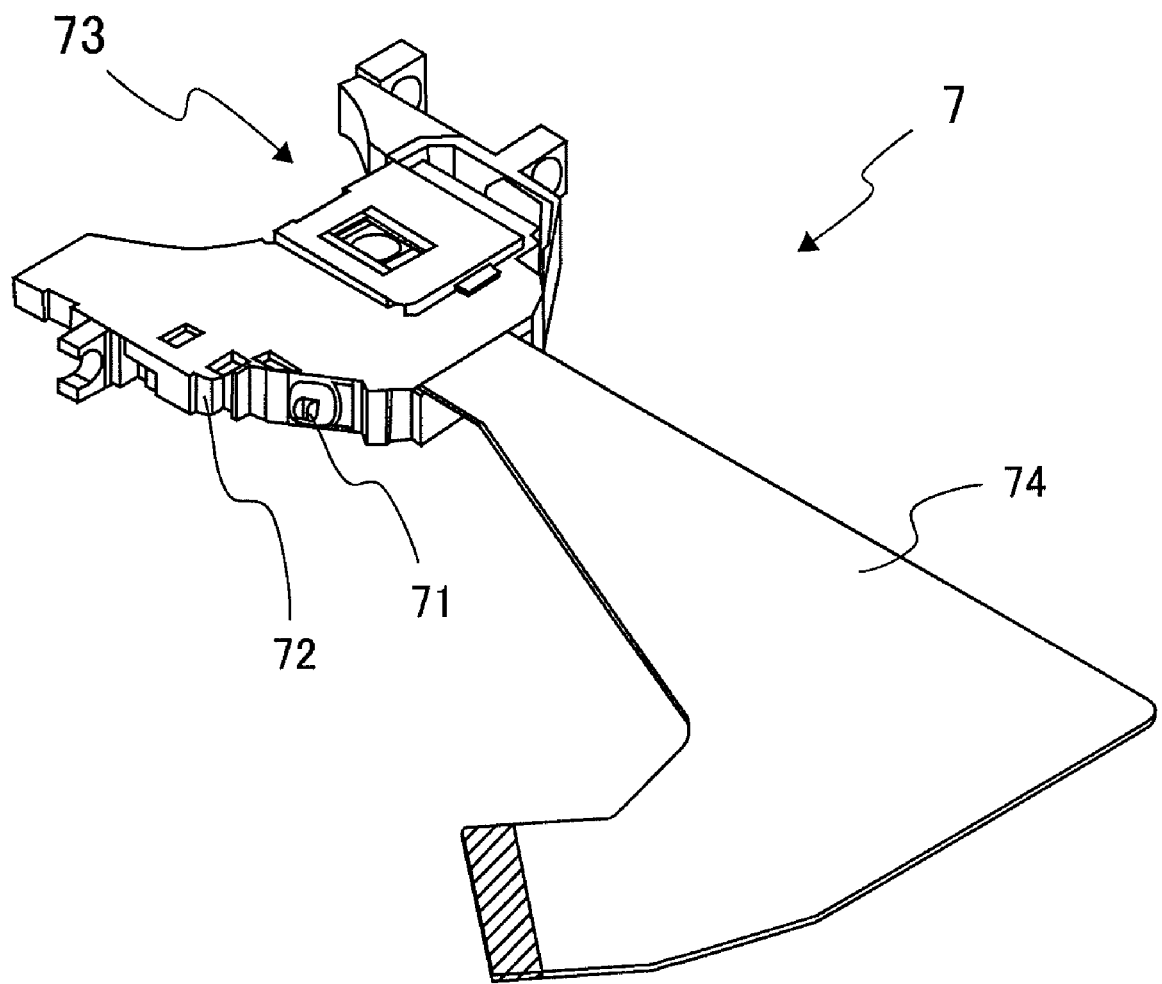
FIG. 8 is a perspective view for showing an optical head, applying the objective lens actuator therein, according to the present invention.

FIG. 8 is a perspective view of an optical head 7, applying the objective lens actuator 73 therein, according to the present invention.

In FIG. 8, the optical head 7 is the device for recording or reproducing information onto/from a disc, and is mainly built up with three elements, i.e., the objective lens actuator 73, an optic system, and a flexible printed-circuit board 74. The optic system is built up with a semiconductor laser 71 for emitting a laser light, a lens or a mirror, not shown in the figure, for dividing the light from the semiconductor laser or condensing it on the disc, and a photo detector 72 for receiving the reflection light from the disc thereon, etc. The flexible printed-circuit board 74 electrically connects the objective lens actuator 73 and the optic system 9 with a circuit board 9 through plural numbers of wiring patterns.

With the present embodiment, by applying the objective lens actuator 73 therein, according to the preset invention, it is possible to suppress generation of an optical aberration accompanying with the tilt of the objective lens 731, and thereby to increase optical characteristics of the optical head 7.

Embodiment 6

Figure 9:
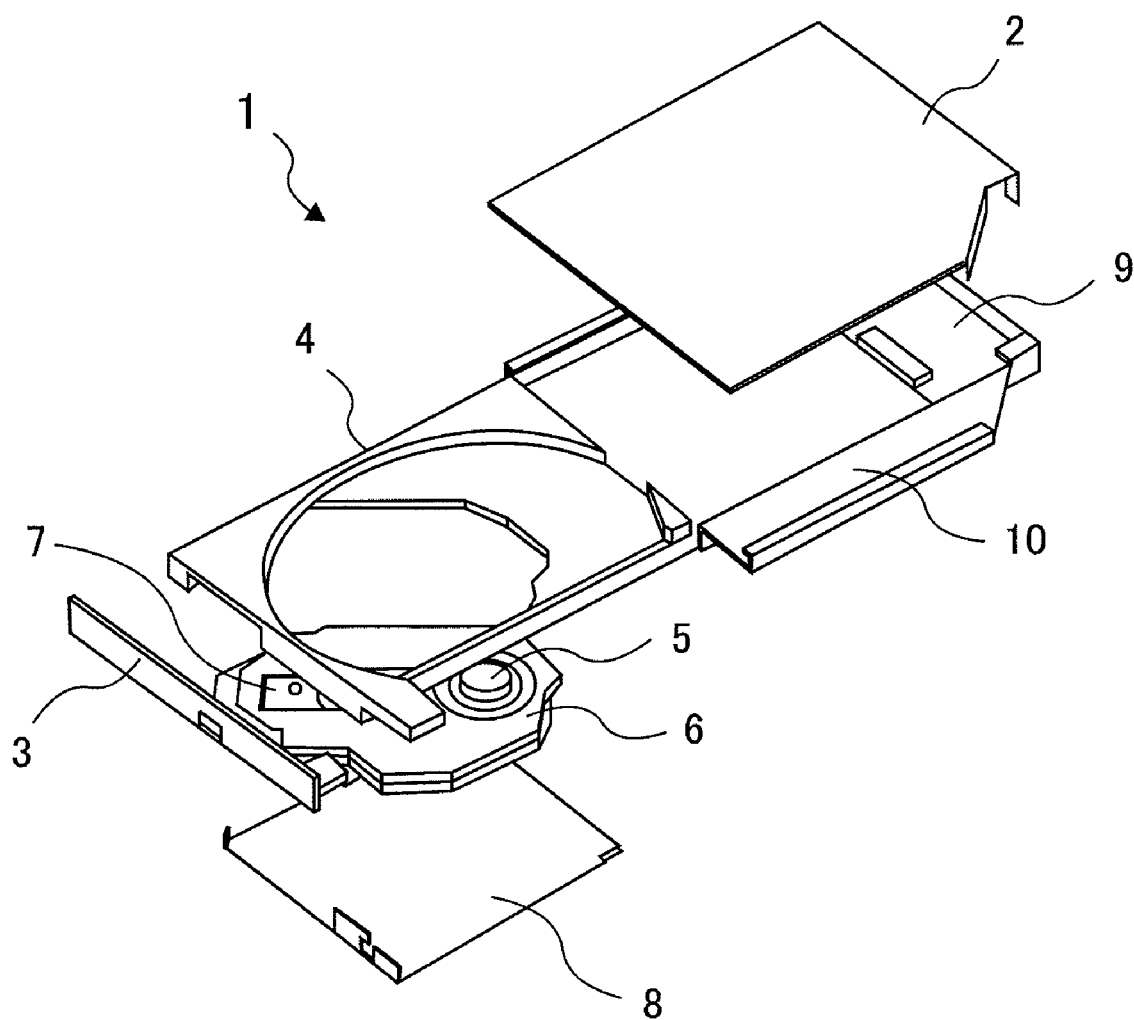
FIG. 9 is an exploded perspective view for showing a disc apparatus, applying the objective lens actuator therein, according to the present invention.
Figure 10:
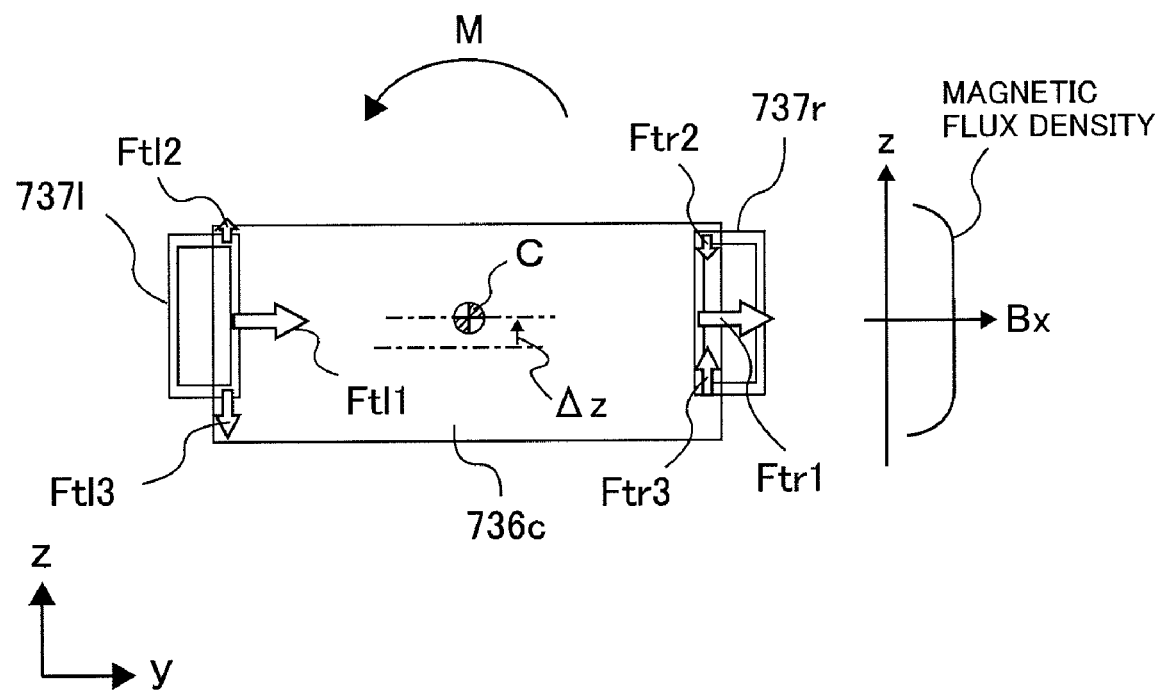
FIG. 10 is a side view for showing forces, which are generated in the tracking coils when the moving part operates in the "z" direction, and a moment rotating around the "x"-axis, which is generated due to those forces, in the objective lens actuator of the conventional art.

FIG. 9 is an exploded perspective view of a disc apparatus 1 applying the objective lens actuator 73 therein, according to the present invention.

In FIG. 9, the disc apparatus 1 is mainly built up with a bottom case 10, a disc tray 4 for transferring the disc, i.e., the recording medium of information, into/from the apparatus, and a circuit board 9 mounting thereon semiconductor parts for conducting driving control and signal processing of electronic parts mounted within the disc apparatus. On an upper surface and a front surface of the bottom case 10 are provided a top case 2 and a front panel 3, respectively, and they cover the upper surface and the front surface of the bottom case 10.

On the disc tray 4 is attached a unitized mechanism portion (hereinafter, being called a "unit mechanism") 6, and the lower surface of which is covered by an under cover 8. On the unit mechanism 6 are mounted a spindle motor 5 for rotating the disc, the optical head 7, and an optical head transfer mechanism for moving the optical head 7 in the radial direction of the disc along with a guide shaft not shown in the figure.

In the present embodiment, with mounting the optical head 7 applying the objective lens actuator 73, according to the present invention, in the disc apparatus 1, because of no necessity of excessive electric power for compensating the tilt of the objective lens 731, it is possible to achieve electric power saving. Also with an increase of the optical characteristics of the optical head 7, it is possible to increase reliability in the operation of recording information on the disc and of reproducing of the disc information therefrom.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An objective lens actuator for driving an objective lens in a focusing direction and a tracking direction, so as to focus lights on a recording surface of an optical disc, as a recording medium of information, comprising:
   a magnet;
   a lens holder, which is configured to hold said lens thereon; and
   four (4) pieces of tracking coils are disposed in a line on a side surface of said lens holder for holding said objective lens thereon, facing to said magnet;
   wherein said four (4) pieces of tracking coils are connected in series, lengths of coil wires per one (1) turn of said four (4) pieces of tracking coils are equal to each other, and the number of turns of two (2) pieces of tracking coils lying on an outside far from said objective lens among said four (4) pieces of tracking coils is less than the number of turns of two (2) pieces of tracking coils lying in an outside near to said objective lens among said four (4) pieces of tracking coils.

2. An optical head, being characterized in that the objective lens actuator as described in the claim 1 is used therein.

3. A disc apparatus, being characterized in that the optical head as described in the claim 2 is used therein.

4. An objective lens actuator for driving an objective lens in a focusing direction and a tracking direction, so as to focus lights on a recording surface of an optical disc, as a recording medium of information, comprising:
   a magnet;
   a lens holder, which is configured to hold said lens thereon; and
   four (4) pieces of tracking coils are disposed in a line on a side surface of said lens holder for holding said objective lens thereon, facing to said magnet;
   wherein said four (4) pieces of tracking coils are connected in series, lengths of coil wires per one (1) turn and the number of turns of said four (4) pieces of tracking coils are equal to each other, and distance between two (2)

pieces of tracking coils lying on an outside far from said objective lens among said four (4) pieces of tracking coils and the magnet facing to those is longer than distance between two (2) pieces of tracking coils lying in an inside near to said objective lens among said four (4) pieces of tracking coils and the magnet facing to those.

5. An optical head, being characterized in that the objective lens actuator as described in the claim 4 is used therein.

6. A disc apparatus, being characterized in that the optical head as described in the claim 5 is used therein.

7. An objective lens actuator for driving an objective lens in a focusing direction and a tracking direction, so as to focus lights on a recording surface of an optical disc, as a recording medium of information, comprising:

a magnet;

a lens holder, which is configured to hold said lens thereon; and four (4) pieces of tracking coils are disposed in a line on a side surface of said lens holder for holding said objective lens thereon, facing to said magnet;

wherein said four (4) pieces of tracking coils are connected in series, length of coil wire locating in said focusing direction of two (2) pieces of tracking coils lying on an outside far from said objective lens among said four (4) pieces of tracking coils is longer than length of coil wire locating in said focusing direction of two (2) pieces of tracking coils lying in an inside near to said objective lens among said four (4) pieces of tracking coils, and the number of turns of two (2) pieces of tracking coils lying on the outside far from said objective lens among said four (4) pieces of tracking coils is less than the number of turns of two (2) pieces of tracking coils lying in the inside near to said objective lens among said four (4) pieces of tracking coils.

8. An optical head, being characterized in that the objective lens actuator as described in the claim 7 is used therein.

9. A disc apparatus, being characterized in that the optical head as described in the claim 8 is used therein.

10. An objective lens actuator for driving an objective lens in a focusing direction and a tracking direction, so as to focus lights on a recording surface of an optical disc, as a recording medium of information, comprising:

a magnet;

a lens holder, which is configured to hold said lens thereon; and four (4) pieces of tracking coils are disposed in a line on a side surface of said lens holder for holding said objective lens thereon, facing to said magnet;

wherein said four (4) pieces of tracking coils are divided into two groups, two (2) pieces of tracking coils on an outside far from said objective lens among said four (4) pieces of tracking coils and two (2) pieces of tracking coils in an inside to said objective lens among said four (4) pieces of tracking coils, said two (2) groups of tracking coils are connected with, in parallel, lengths of coil wires per one (1) turn and numbers of turns of said four (4) pieces of tracking coils are equal to each other, and diameter coil wire of two (2) pieces of tracking coils lying on an outside far from said objective lens among said four (4) pieces of tracking coils is smaller than diameter coil wire of two (2) pieces of tracking coils lying in an inside near to objective lens among said four (4) pieces of tracking coils.

11. An optical head, being characterized in that the objective lens actuator as described in the claim 10 is used therein.

12. A disc apparatus, being characterized in that the optical head as described in the claim 11 is used therein.

\* \* \* \* \*